United States Patent [19]
Kwok

[11] Patent Number: 5,676,411
[45] Date of Patent: Oct. 14, 1997

[54] PORTABLE DROPPING COLLECTING FRAME FOR PETS

[76] Inventor: Wang-On Kwok, Room 601, Ricky Centre, 36 Chong Yip Street, Kwun Tong, Kowloon, Hong Kong

[21] Appl. No.: 736,685

[22] Filed: Oct. 25, 1996

[51] Int. Cl.[6] ............................................. A01K 29/00
[52] U.S. Cl. ............................................................. 294/1.5
[58] Field of Search ............................ 294/1.3–1.5, 19.1, 294/55, 99.1; 15/104.8, 257.1, 257.4, 257.6, 257.7; 119/161; 248/95, 99, 101

[56] References Cited

U.S. PATENT DOCUMENTS

| | | | |
|---|---|---|---|
| 3,819,220 | 6/1974 | Bredt | 294/1.5 |
| 4,010,970 | 3/1977 | Campbell | 294/1.5 |
| 4,012,067 | 3/1977 | Travis | 294/1.4 |
| 4,236,741 | 12/1980 | Emme | 294/1.5 |
| 4,257,635 | 3/1981 | Mainprice | 294/1.4 |
| 4,717,186 | 1/1988 | Yoshioka | 294/1.5 |
| 4,852,924 | 8/1989 | Ines | 294/1.5 |
| 5,540,470 | 7/1996 | Lu | 294/1.4 |

*Primary Examiner*—Johnny D. Cherry
*Attorney, Agent, or Firm*—Morton J. Rosenberg; David L. Klein

[57] ABSTRACT

A portable dropping collecting frame for pets includes a main handle, an extension handle and a substantially V-shaped resilient support. The main handle has a long groove at an upper lateral side thereof and is pivotally connected to the extension handle at a top end thereof by means of a ring. The extension handle has a rib for matching the groove so that the extension handle may be rotated and folded along the side of the main handle. The bottom end of the main handle is provided with two pivot portions for mounting a support element which is provided with a cylindrical insert block at a front end thereof for locking with the resilient support. The top side of the support element is provided with a pivot block for pivotally connecting a substantially L-shaped control link for controlling a clamp that may be secured on the insert block. A plastic bag may fit onto the resilient support and may be fully opened and held in position by means of two support arms of the resilient support and the clamp for collecting the pet's droppings. The control link may be pulled with a thumb to release the clamp so that the plastic bag along with the droppings may be disposed into a garbage bin without contaminating the hands or the collecting frame.

1 Claim, 6 Drawing Sheets

PORTABLE DROPPING COLLECTING FRAME FOR PETS

BACKGROUND OF THE INVENTION (a) Field of the Invention

The present invention relates generally to a portable dropping collecting frame for pets, and more particularly to a dropping collecting frame which may be collapsed to facilitate carrying and storage and which may help to collect and dispose of pets' droppings in a neat and convenient way without contaminating the frame itself or the hands.

(b) Description of the Prior Art

Disposal of pets' droppings has been a problem to many a pet master especially those who like to run dogs in the streets. If the dog empties its bowels in the street or worse still in a public place, the master will be very embarrassed and need to clean up. Oftentimes, there may not be proper means to clean up the droppings. There is a possibility that the hands will get contaminated in using plastic bags, newspapers or tissue paper to clean up and will have to be washed, which is very inconvenient. On the contrary, if the master just walks away without cleaning up the mess, he/she may have qualms or even be fined. With people paying more attention to environmental protection and the legislation of stricter laws in this regard, pet masters will have fewer and fewer opportunities to run dogs in the streets.

SUMMARY OF THE INVENTION

Accordingly, a primary object of the present invention is to provide a portable dropping collecting frame for pets which may not only contaminate the environment but also eliminate the problems with disposing of pets' droppings.

Another object of the present invention is to provide a portable dropping collecting frame for pets which may help collect and dispose of pets' droppings in a convenient and sanitary way without contaminating the hands or the frame itself.

BRIEF DESCRIPTION OF THE DRAWINGS

The foregoing and other features and advantages of the present invention will be more clearly understood from the following detailed description and the accompanying drawings, in which.

FIGS. 2, 2A and 2B are elevational views illustrating the clamping of a bag on a resilient support of the invention;

FIGS. 3 and 3A are elevational views illustrating operation of a control link to drop the bag along with the pet's droppings into a garbage bin;

DETAILED DESCRIPTION OF THE PREFERRED EMBODIMENT

Figure 1:
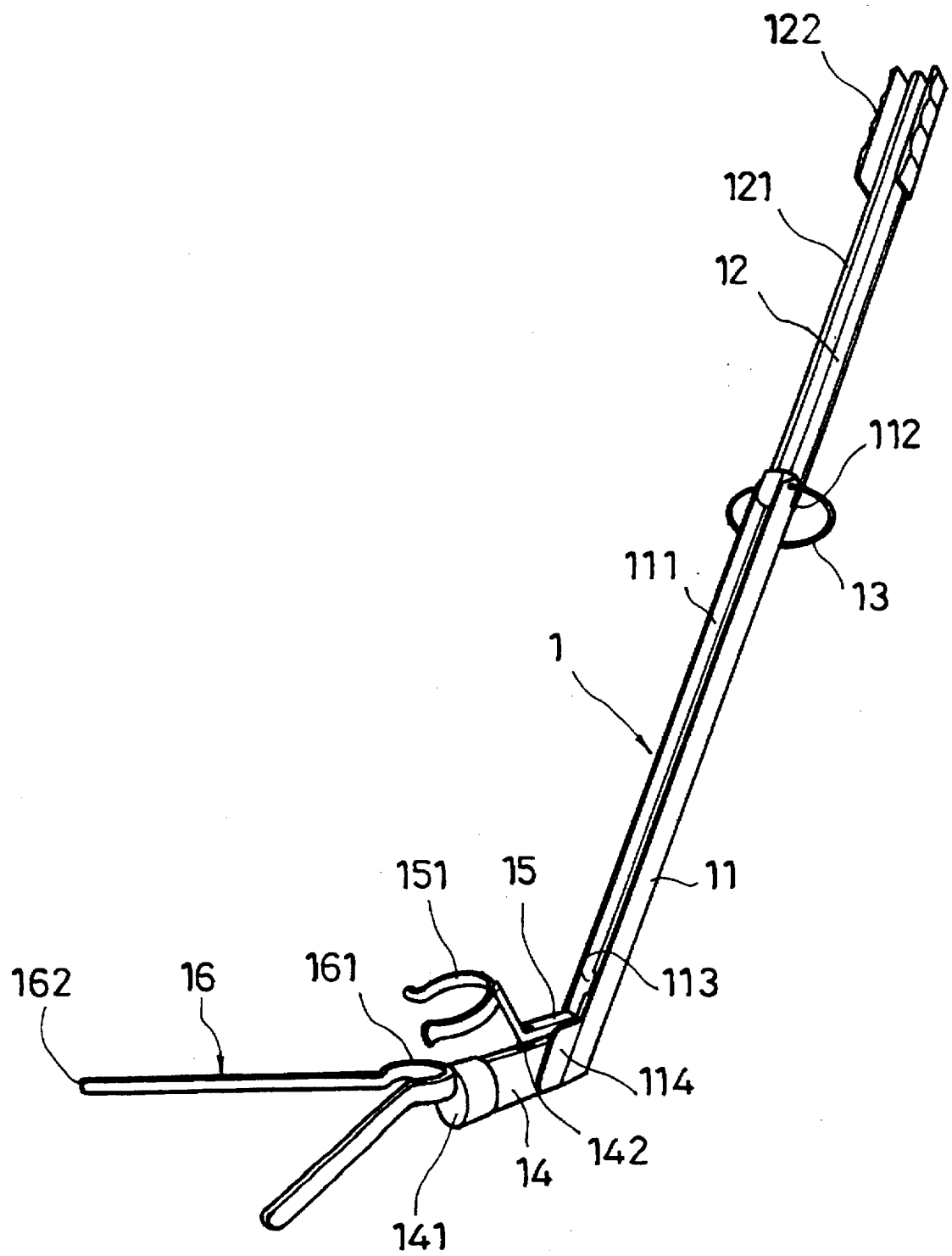
FIG. 1 is an elevational view of the present invention.
Figure 2:
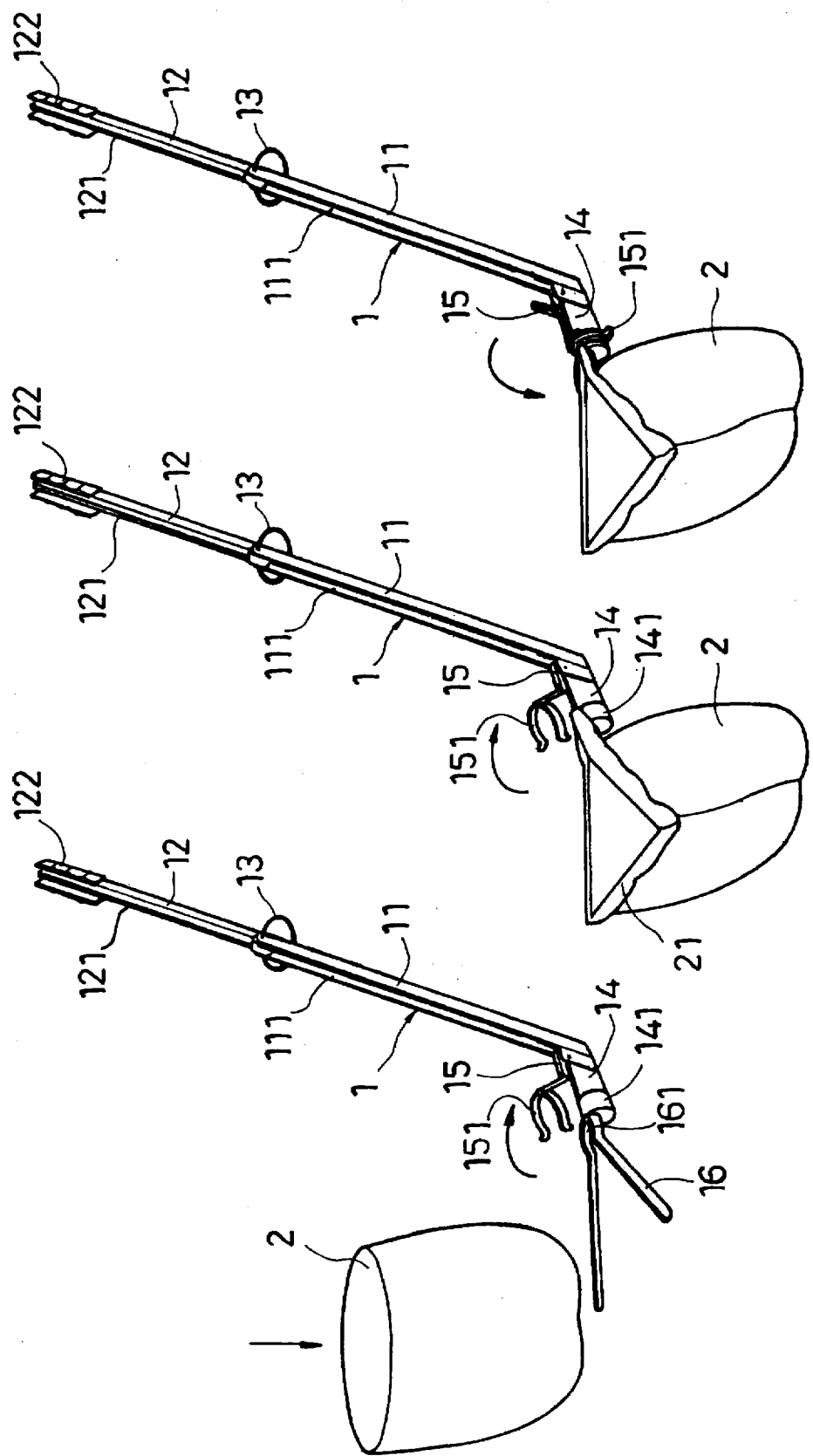

With reference to FIG. 1, the present invention essentially comprises a main handle 11, an extension handle 12 and a resilient support 16. The main handle 11 is a long rod structure having a longitudinally oriented elongated groove 111 at an upper lateral side thereof. The top end of the main handle 11 is provided with a notch 112, the two side walls of which are pivotally connected via a ring 13 to the extension handle 12 such that the extension handle 12 may pivot about the ring 13. The extension handle is provided with a longitudinal rib 121 at an upper lateral side thereof, and both sides of its top end are each provided with a grip portion 122. By means of the downward rotation of the extension handle 12 which causes the rib 121 thereof to extend into the groove 111 of the main handle 11, the extension handle 12 may be folded along the side of the main handle 11, with the grip portions 122 insertably located and secured at the outer side of the main handle 11. The two sides of the bottom end of the main handle 11 are each integrally provided with a pivot portion 114, and a through hole 113 is disposed near the pivot portion 114 to penetrate the groove 111. Between the two pivot portions 114 is screwably provided a support element 14. The front end of the support element 14 is provided with a cylindrical insert block 141 for locking with the resilient support 16 that is substantially V-shaped. The top end of the insert block 141 is pivotally connected to a pivot block 142 for pivotally connecting a substantially L-shaped control link 15. At the front end of the control link 15 and near the bottom rim of the insert block 141 is provided an annular clamp 151. By pushing the control link, the clamp 151 may be lifted or fit onto the insert block 141 so that the clamp 151 may clamp objects. In addition, the resilient support 16 includes an annular resilient portion 161 and two support arms extended apart from each other at a suitable angle. The front end of each support arm is configured to form a downwardly slanting end 162 such that the angle of the slant may firmly hold a bag fitted onto the support arms of the resilient support 16.

With reference to FIGS. 2, 2A, 2B and 5, use of the present invention is illustrated. A plastic bag 2 of a suitable shape is fitted onto the resilient support 16 such that an upper rim portion 21 of the bag 2 is folded outwardly to allow the entire bag 2 to be fully opened along the support arms of the resilient support 16. That portion of the upper rim portion 21 of the bag 2 near the control link 15 is pulled rearwardly to below the clamp 151 which clamps the bag 2 on the insert block 141. The bag 2 is therefore ready for receiving the pet's droppings. As the resilient support 16 is entirely covered by the upper rim portion 21 of the bag 2 during use, the pet's dropping may not come into direct contact therewith, which is very sanitary.

Figure 3:
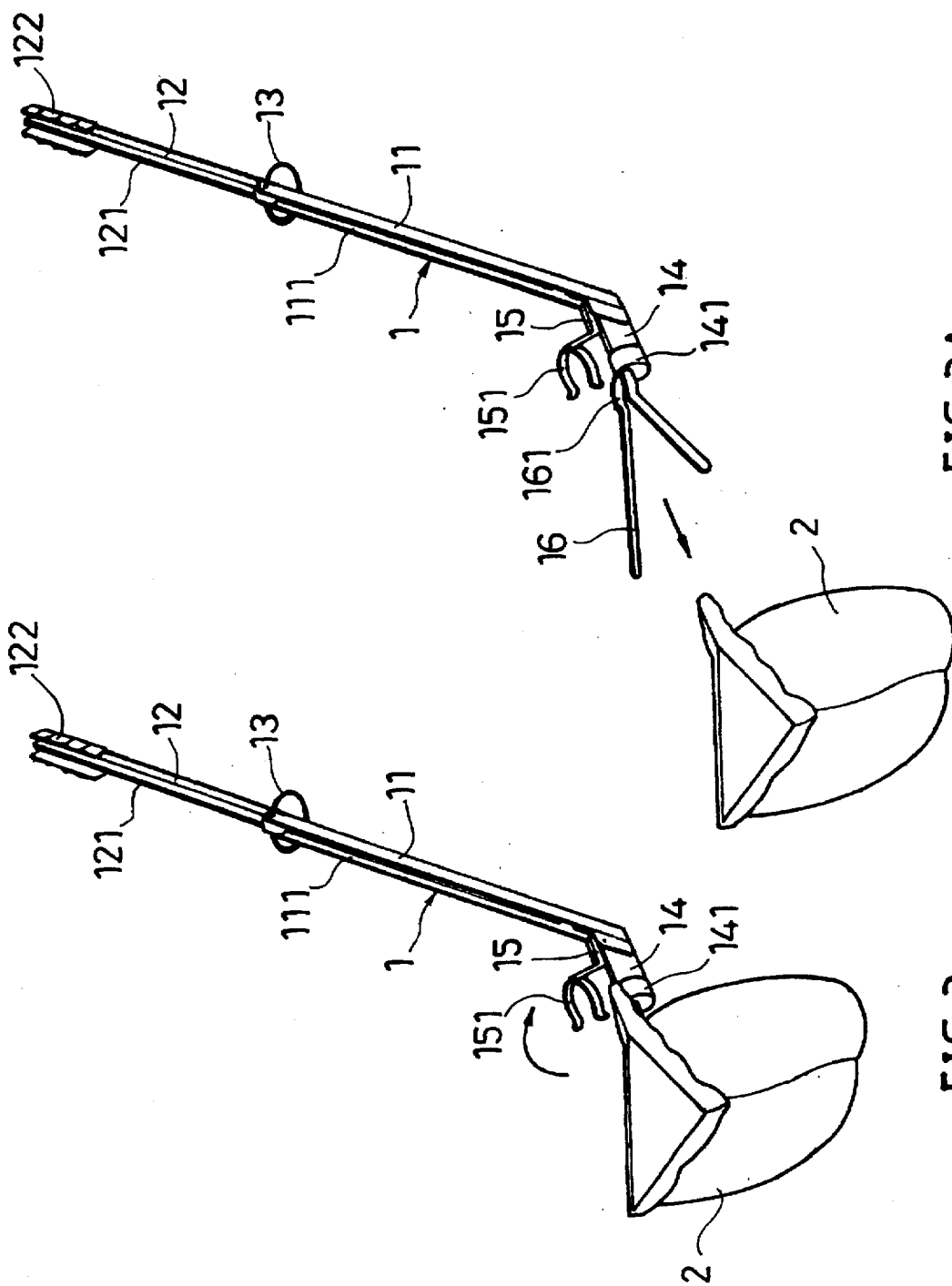

With reference to FIGS. 3 and 3A, when the pet has finished, the user may hold the grip portions 122 to lift the present invention rearwardly such that the bag 2 may incline forwardly due to the weight of the pet's droppings and the opening of the bag 2 may thus be closed to cover up the bad odor of the droppings. The user may then walk to a nearby garbage bin and dispose of the bag 2 with the droppings in a neat way. To remove the bag 2, the bag is suspended at the opening of the garbage bin and the user pulls the control link 15 controlling the clamp 151 rearwardly so that the clamp 151 disengages from the insert block 141 and the bag 2 held thereon may slide along the resilient support 16 to drop into the garbage bin. All this can be done in a neat way without contaminating the hands, which is very convenient indeed.

Figure 4:
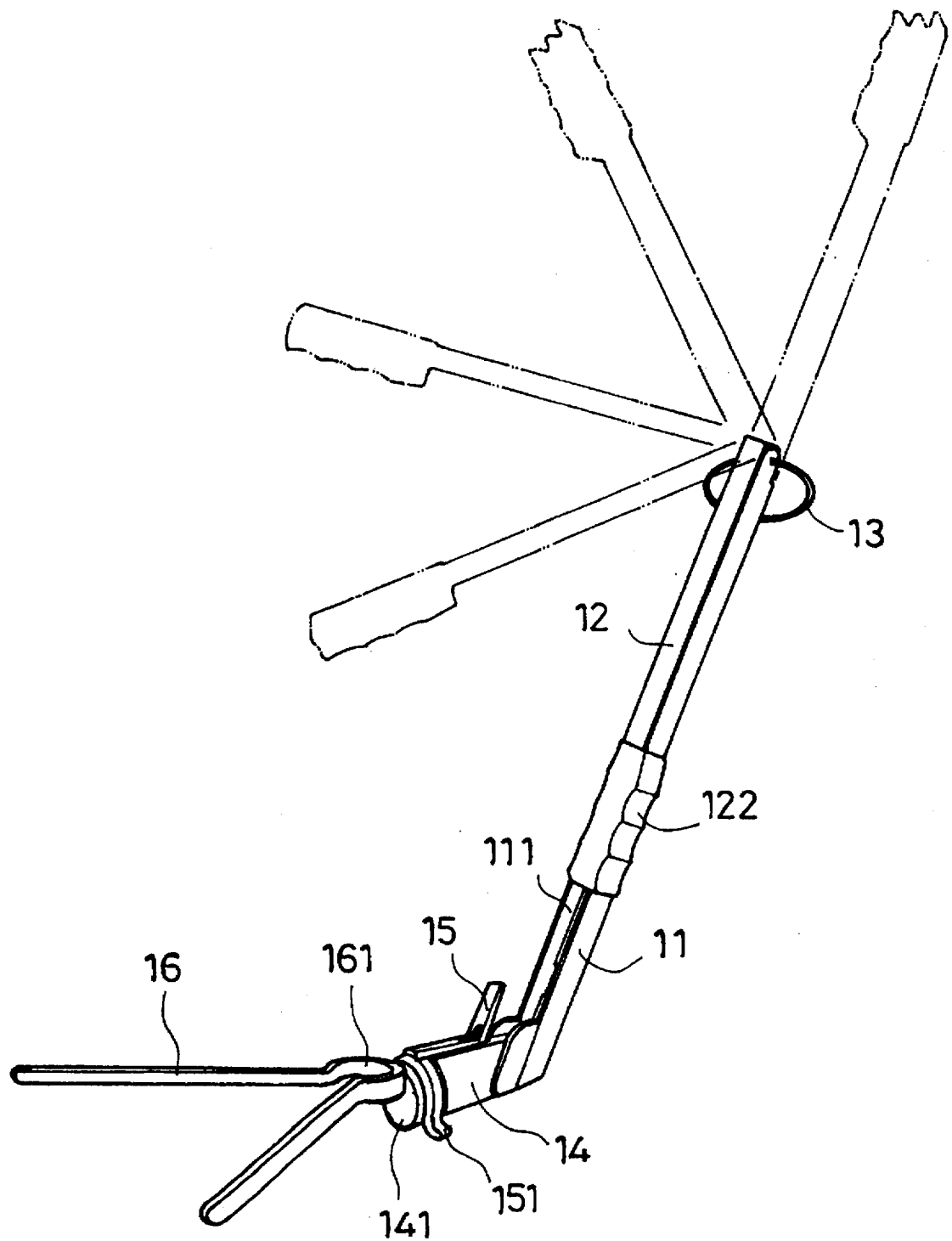
FIGS. 4, 4A and 4B are elevational views illustrating the folding of the present invention to facilitate carrying.
Figure 4A:
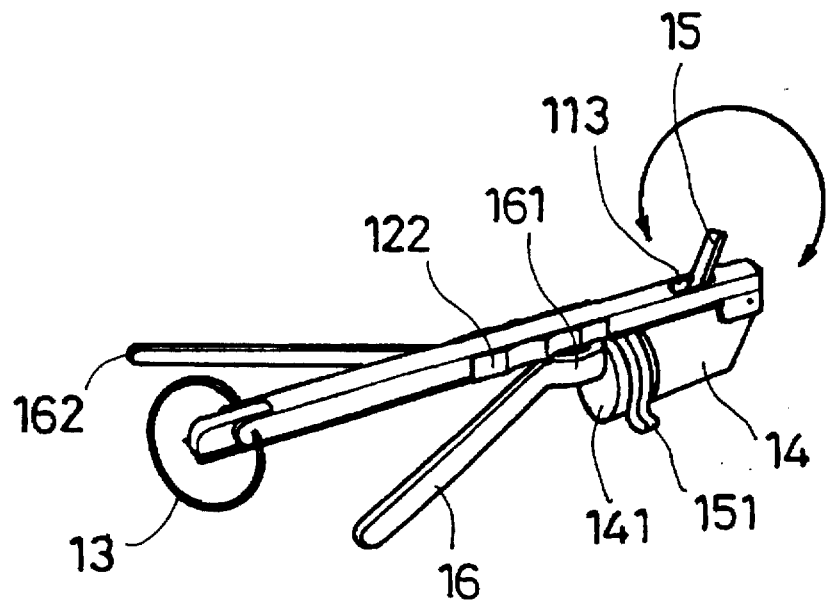
Figure 4B:
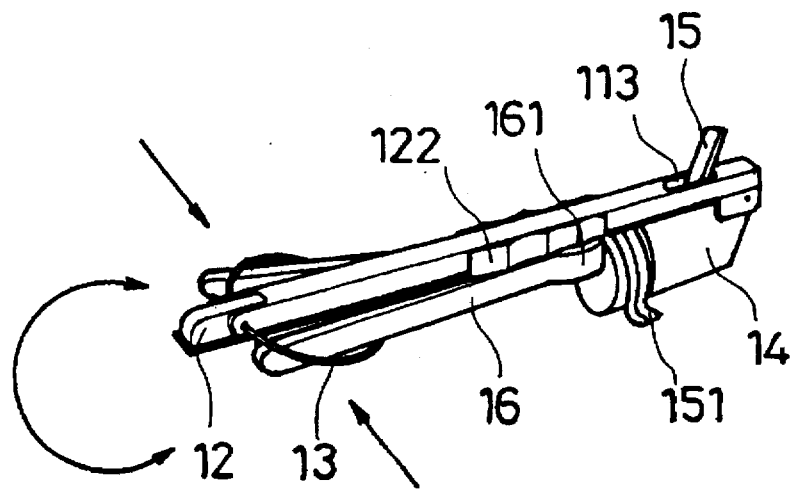
Figure 5:
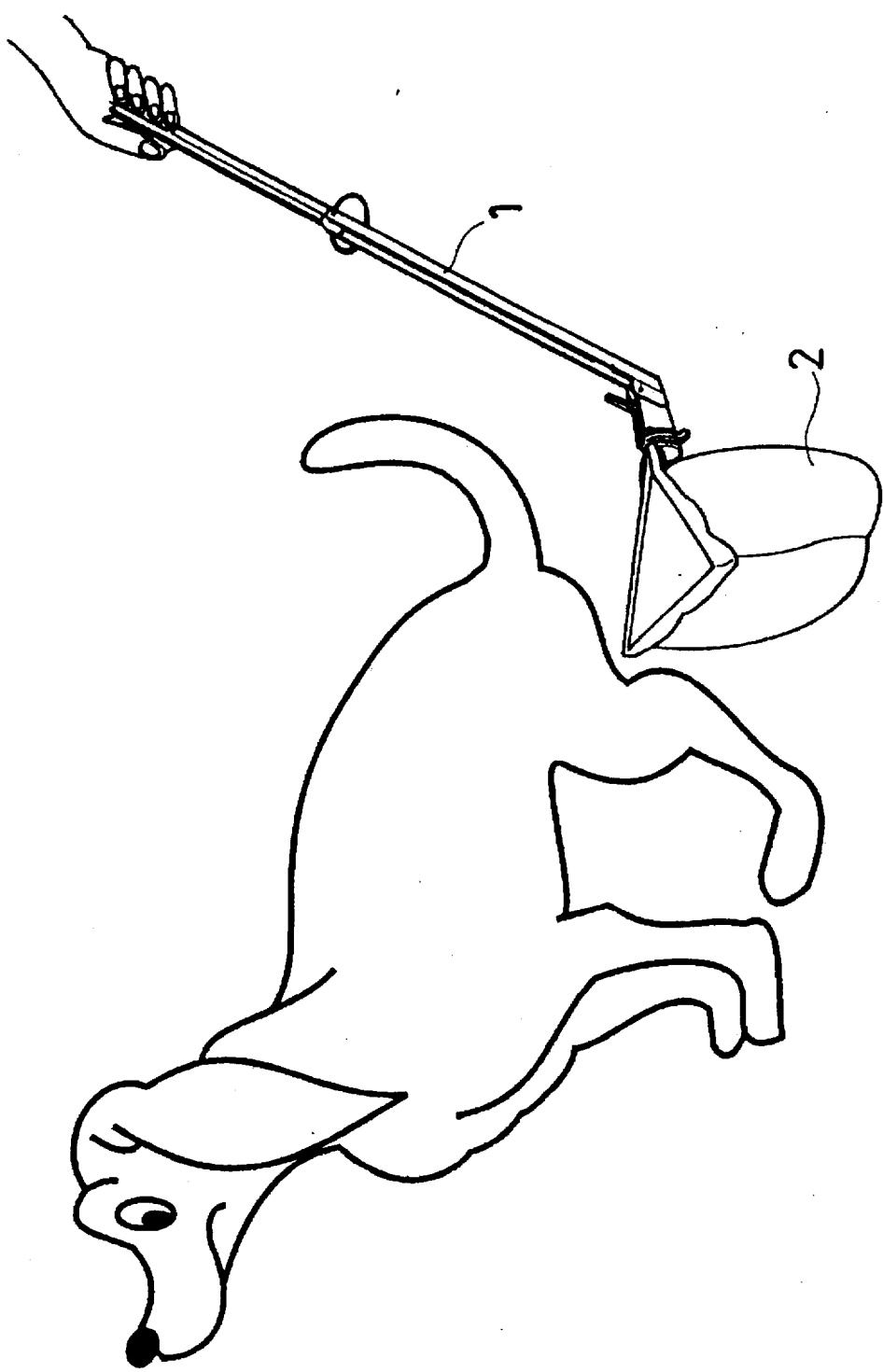
FIG. 5 is an elevational view illustrating the stretching of the bag on the resilient support of the invention.

Finally, with reference to FIGS. 4, 4A and 4B, the present invention may be folded up into a minimum size to facilitate carrying. First, the extension handle 12 is rotated downwardly such that its rib 121 extends into the groove 111 of the main handle 1 and rests against the side of the main handle 11. The grip portions 122 are then insertably disposed and secured at the outer side of the main handle 11 in a folded state. By pushing the resilient support 16 so that it brings the support element 14 to turn to the side of the main handle 11 with the control link 15 at the top end of the support element 14 insertably located in the groove 111 and the through hole 113, the resilient support 16 may be closed on the main handle 11 to the greatest extent. The ring 13 is then pulled up to hold the two support arms therein. In this way, the present invention may be folded up in a very compact size to facilitate storage and carrying.

Furthermore, the bag 2 may be pre-fitted on the resilient support before use. The main handle 11 and resilient support 16 along with the bag 2 may be folded as a whole and held in the ring 13. To get ready for use, it is only necessary to release the ring 13, and the resilient support 16 will open to stretch out the bag 2. The support element 14 and the extension handle 12 are then pulled out from the main handle 11.

In summary, the present invention permits sanitary collection and disposal of pets' droppings in a neat way without contaminating the hands or creating bad odors. Although the present invention has been illustrated and described with reference to the preferred embodiment thereof, it should be understood that it is in no way limited to the details of such embodiment but is capable of numerous modifications within the scope of the appended claim.

What is claimed is:

1. A portable dropping collecting frame for pets, comprising:

a main handle, said main handle being a substantially long rod structure, an upper lateral side thereof forming a longitudinally oriented elongated groove for storage purposes, said main handle having a top end provided with a notch having two side walls which are pivotally connected via a ring to an extension handle, a bottom end of said main handle having two sides each of which is integrally provided with a pivot portion, said pivot portions commonly screwably connecting a support element, a through hole penetrating said groove being disposed near said pivot portions;

said extension handle having a longitudinally oriented rib disposed at an upper lateral side thereof relative to said groove of said main handle such that when said extension handle is rotated, said rib may just extend into said groove of said main handle to allow said extension handle to be folded along the side of said main handle, a top end of said extension handle having both sides respectively provided with a grip portion which may be insertably arranged and secured at the outer side of said main handle;

said support element having a front end thereof provided with a cylindrical insert block for locking with a substantially V-shaped resilient support, a pivot block being integrally provided at a top end of said support element for pivotally connecting a substantially L-shaped control link, said support element capable of being folded along the side of said main handle such that said control link at the top end thereof may fit into said groove and said through hole of said main handle;

said control link having an annular clamp disposed at a front end thereof near a bottom rim of said insert block and capable of being pulled up or secured on said insert block to clamp an object;

said resilient support having an annular resilient portion disposed at a rear end thereof capable of keeping two support arms of said resilient support extended at a suitable angle and providing a suitable resilience when said support arms are being pressed, a downwardly slanting end being formed at a front end of each of said support arms to facilitate firm fitting of a plastic bag of a suitable size onto said resilient support, whereby the plastic bag may be fitted onto said resilient support and clamped by said clamp on said insert block so that the plastic bag may be fully opened and supported on said resilient support for collecting a pet's droppings; said collecting frame may be lifted rearwardly to close the opening of the plastic bag so as to cover up the bad odor of the droppings; said control link may be pulled rearwardly with a thumb to cause said clamp to release the plastic bag so that the plastic bag may slide along said resilient support due to the weight of the droppings into a garbage bin, without contaminating said resilient support or the hands; and said collecting frame may be folded up in a compact size to facilitate storage and carrying.

* * * * *